US010925027B2

(12) United States Patent
Liu et al.

(10) Patent No.: US 10,925,027 B2
(45) Date of Patent: Feb. 16, 2021

(54) PROCESSING METHOD FOR TRACKING UE IN LOW POWER MODE, AND DEVICE

(71) Applicant: Huawei Technologies Co., Ltd., Guangdong (CN)

(72) Inventors: Jin Liu, Shenzhen (CN); Kelvin Kar Kin Au, Shenzhen (CN); Liqing Zhang, Ottawa (CA); Jinfang Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 80 days.

(21) Appl. No.: 16/266,774

(22) Filed: Feb. 4, 2019

(65) Prior Publication Data

US 2019/0174447 A1    Jun. 6, 2019

Related U.S. Application Data

(63) Continuation of application No. PCT/CN2017/091288, filed on Jun. 30, 2017.

(30) Foreign Application Priority Data

Aug. 11, 2016  (CN) .......................... 2016 1 0665324

(51) Int. Cl.
*H04W 56/00*  (2009.01)
*H04W 52/02*  (2009.01)
(Continued)

(52) U.S. Cl.
CPC ..... *H04W 56/0045* (2013.01); *H04W 52/028* (2013.01); *H04W 52/0216* (2013.01);
(Continued)

(58) Field of Classification Search
CPC ........... H04W 52/0216; H04W 52/028; H04W 56/0045; H04W 56/006; H04W 64/003; H04W 76/28; Y02D 70/00
See application file for complete search history.

(56) References Cited

U.S. PATENT DOCUMENTS

| 2005/0053099 A1* | 3/2005 | Spear ................ H04W 56/0055 370/508 |
| 2010/0029291 A1* | 2/2010 | Angelow .......... H04W 56/0005 455/450 |

(Continued)

FOREIGN PATENT DOCUMENTS

| CN | 101483858 A | 7/2009 |
| CN | 101646234 A | 2/2010 |

(Continued)

OTHER PUBLICATIONS

Huawei et al., "UE mobility tracking in "active state" and in "power saving" state", 3GPP TSG-RAN2 Meeting #94, R2-164129, 9.5.1, May 23-27, 2016, 6 pages, Nanjing, China.

*Primary Examiner* — Rina C Pancholi
(74) *Attorney, Agent, or Firm* — Slater Matsil, LLP

(57) ABSTRACT

Embodiments of this application provide a processing method for tracking a user equipment (UE) in a low power mode, and a device. The method includes: obtaining transmission configuration information between the UE and a network device, where the transmission configuration information indicates that an uplink tracking signal is to be sent according to a discontinuous transmission mode, and the transmission configuration information includes a transmission cycle. When the UE enters a low power mode, sending an uplink tracking signal to the network device based on the transmission configuration information; and receiving timing advance (TA) adjustment information returned by the network device, where the TA adjustment information is obtained by the network device through detection of the uplink tracking signal.

20 Claims, 7 Drawing Sheets

(51) Int. Cl.
*H04W 76/28* (2018.01)
*H04W 64/00* (2009.01)

(52) U.S. Cl.
CPC ....... *H04W 56/006* (2013.01); *H04W 64/003* (2013.01); *H04W 76/28* (2018.02); *Y02D 30/70* (2020.08)

(56) References Cited

U.S. PATENT DOCUMENTS

| | | | | |
|---|---|---|---|---|
| 2010/0137013 | A1* | 6/2010 | Ren | H04W 52/0216 455/500 |
| 2011/0130141 | A1* | 6/2011 | Frost | H04W 36/32 455/436 |
| 2012/0014371 | A1* | 1/2012 | Weng | H04J 3/0682 370/350 |
| 2014/0086219 | A1* | 3/2014 | Suzuki | H04W 56/0005 370/336 |
| 2015/0117285 | A1* | 4/2015 | Xie | H04W 52/0216 370/311 |
| 2017/0202053 | A1* | 7/2017 | Rune | H04W 72/0453 |
| 2017/0325189 | A1 | 11/2017 | Sun et al. | |

FOREIGN PATENT DOCUMENTS

| | | |
|---|---|---|
| CN | 102781073 A | 11/2012 |
| CN | 102958073 A | 3/2013 |
| CN | 103313250 A | 9/2013 |

\* cited by examiner

PROCESSING METHOD FOR TRACKING UE IN LOW POWER MODE, AND DEVICE

CROSS-REFERENCE TO RELATED APPLICATIONS

This application is a continuation of International Application No. PCT/CN2017/091288 filed on Jun. 30, 2017, which claims priority to Chinese Patent Application No. 201610665324.6 filed on Aug. 11, 2016. The disclosures of the aforementioned applications are hereby incorporated by reference in their entireties.

TECHNICAL FIELD

Embodiments of the present application relate to communications technologies, and in particular, to a processing method for tracking user equipment (UE) in a low power mode, and a device.

BACKGROUND

A future communications system needs to support massive user access. These massive users usually have infrequent small packet data services. When infrequent small packet data arrives, if user equipment (UE) is reactivated to enter a CONNECTED mode from an IDLE mode through radio resource control in a Long Term Evolution (LTE) or Long Term Evolution Advanced (LTE-A) mechanism, a control plane (C-plane) connection needs to be first established, and then a data plane connection needs to be established, causing a large amount of signaling/information exchange overheads and a data transmission latency.

To resolve the problem, a third UE mode is put forward, namely, an energy conserved operation (ECO) mode, also referred to as a low power mode. In this mode, a radio resource control (RRC) context is reserved between UE and a network. When the UE in the ECO mode has an uplink service, the UE directly sends the uplink service in a grant-free manner. To be specific, the UE does not need to be activated to enter the CONNECTED mode, and an RRC connection establishment process is not initiated. Therefore, no network command authorization is performed, and data is directly sent on a predefined resource. Although the ECO mode is an energy conservation mode, the UE should minimize signaling overheads and reduce a quantity of times for enabling signal reception and transmission. However, when the uplink data of the UE is sent in the grant-free manner, timing arriving at a transmission/reception point (TRP) may change with time and place. For example, a transmission latency of mobile UE to the TRP changes constantly.

In a random access process of an existing LTE/LTE-A system, an evolved NodeB (eNodeB) determines a timing advance (TA) value by measuring a received uplink preamble. A timing advance command (TAC) (11 bits in total) is carried by using Media Access Control (MAC) payload of a random access response (RAR). The timing advance command is sent to the UE, to indicate a timing adjustment value of the UE. This process is referred to as an "initial uplink synchronization process". When the UE is in an RRC_CONNECTED mode, the eNodeB determines a TA value of each UE based on measurement of uplink transmission of the corresponding UE. Therefore, as long as the UE has uplink transmission, the eNodeB may correspondingly estimate the TA value. Theoretically, any signal sent by the UE may be used for measuring the TA value. If specific UE requires correction, the eNodeB sends a TAC (6 bits) to the UE, to request the UE to adjust uplink transmission timing. This process is referred to as an "uplink synchronization update process".

However, the timing adjustment method in the "initial uplink synchronization process" is used in a random access process, and includes tedious access steps. In addition to the TAC, the MAC layer signaling RAR delivered by the eNodeB further carries a radio network temporary identifier (RNTI) and uplink assignment information in the random access process. In the "uplink synchronization update process", a network side sends the TAC to the UE at any time, and the UE needs to detect a control channel of each scheduling unit. Therefore, the foregoing manner of obtaining a TA value by UE consumes a large amount of signaling overheads and is unsuitable for timing advance amount adjustment in the ECO mode.

SUMMARY

Embodiments of this application provide a processing method for tracking UE in a low power mode, and a device, to resolve a problem that the foregoing manner of obtaining a TA value by UE consumes a large amount of signaling overheads and is unsuitable for timing advance amount adjustment in an ECO mode.

A first aspect of this application provides a processing method for tracking UE in a low power mode, including:

obtaining, by UE, transmission configuration information between the UE and a network device, where the transmission configuration information indicates that an uplink tracking signal is to be sent according to a discontinuous transmission mode, and the transmission configuration information includes a transmission cycle;

when the UE enters a low power mode, sending, by the UE, an uplink tracking signal to the network device based on the transmission configuration information; and receiving, by the UE, TA adjustment information returned by the network device, where the TA adjustment information is obtained by the network device through detection of the uplink tracking signal.

In the foregoing solution, the transmission cycle in the transmission configuration information obtained by the UE may be a fixed cycle, or may be a variable cycle that may change according to a configured rule. To be specific, in a subsequent processing process of tracking the UE, the UE may re-obtain the transmission configuration information to adjust the transmission cycle, or may change the transmission cycle according to a preconfigured cycle changing rule. In addition, in this solution, a network device that obtains the TA adjustment information through detection of the uplink tracking signal may be the network device to which the UE sends the uplink tracking signal, or may be another network device. The another network device obtains the TA adjustment information through detection of the uplink tracking signal, and sends the TA adjustment information to the network device. Then, the network device returns the TA adjustment information to the UE.

In the foregoing solution, after configuration, the uplink tracking signal for tracking the UE is periodically sent to the network device, and the network device returns the TA adjustment information to the UE after the network device receives the uplink tracking signal, to reduce signaling overheads between the UE and the network device. This is more suitable for tracking the UE in the low power mode.

Based on the foregoing solution, the obtaining, by UE, signal transmission configuration information between the UE and a network device includes:

receiving, by the UE, the transmission configuration information sent by the network device.

Based on any foregoing solution, the sending, by the UE, an uplink tracking signal to the network device based on the transmission configuration information includes:

determining, by the UE based on the transmission cycle, a location of a first radio frame and a location of a first scheduling unit in the first radio frame that are for sending the uplink tracking signal; and sending, by the UE at the location of the first scheduling unit in the first radio frame, the uplink tracking signal to the network device.

In this solution, in a specific implementation, a specific manner of the sending, by the UE, an uplink tracking signal based on the transmission configuration information includes: obtaining the location of the first radio frame based on the transmission cycle, where the location of the first radio frame is a time sequence location of the first radio frame or a frame number of the first radio frame, to indicate a moment at which the first radio frame is to be sent; and obtaining a specific location, in the first radio frame, at which the uplink tracking signal is to be sent, that is, the location of the first scheduling unit.

Optionally, the transmission configuration information is further used to indicate that a reception mode of the UE is a discontinuous reception mode, and the transmission configuration information further includes a reception cycle.

In this solution, based on any foregoing solution, the transmission configuration information may further be used to: configure a receiving manner of receiving the TA adjustment information by the UE, where the receiving manner may be configured as the discontinuous reception mode; and configure the reception cycle of receiving the TA adjustment information by the UE. Being similar to the transmission cycle, the reception cycle may be a configured fixed cycle, or may be a variable cycle that changes according to a specific rule.

Optionally, the receiving, by the UE, TA adjustment information returned by the network device includes:

determining, by the UE based on the reception cycle, a location of a second radio frame and a location of a second scheduling unit in the second radio frame that are for receiving the TA adjustment information; and receiving, by the UE at the location of the second scheduling unit in the second radio frame, the TA adjustment information sent by the network device.

Based on the foregoing solution, the receiving, by the UE at the location of the second scheduling unit in the second radio frame, the TA adjustment information sent by the network device includes:

receiving, by the UE at the location of the second scheduling unit in the second radio frame, the TA adjustment information sent by the network device through a downlink control channel; and/or receiving, by the UE at the location of the second scheduling unit in the second radio frame, the TA adjustment information sent by the network device through a downlink shared channel.

In this solution, a specific manner of the receiving, by the UE, TA adjustment information includes: carrying the TA adjustment information by using a data packet, or directly carrying the TA adjustment information by using new downlink control information, or carrying the TA adjustment information by combining downlink control information and a data packet.

Optionally, when a moving speed of the UE is less than a preset speed threshold, the reception cycle is greater than or equal to the transmission cycle.

In this solution, that the moving speed of the UE is less than the preset speed threshold includes a case in which the moving speed of the UE is relatively small and a case in which the UE is static. When the UE is static or the moving speed of the UE is relatively small, a TA adjustment cycle may be very long. Therefore, the reception cycle may be configured greater than the transmission cycle.

Further, the method further includes: adjusting, by the UE, an uplink sending moment based on the TA adjustment information.

In this solution, after obtaining the TA adjustment information, the UE may adjust sending timing based on a TA value, and may send an uplink signal after the adjustment.

Based on any foregoing solution, the receiving, by the UE, the transmission configuration information sent by the network device includes:

receiving, by the UE, radio resource control information sent by the network device, where the radio resource control information includes the transmission configuration information; or receiving, by the UE, a system broadcast message of the network device, where the system broadcast message includes the transmission configuration information.

The UE may receive the transmission configuration information by using the radio resource control information or the system broadcast information of the network device.

A second aspect of this application provides a processing method for tracking UE in a low power mode, including:

sending, by a network device, transmission configuration information to UE, where the transmission configuration information indicates that the UE sends an uplink tracking signal according to a discontinuous transmission mode, and the transmission configuration information includes a transmission cycle for sending the uplink tracking signal by the UE;

receiving, by the network device, the uplink tracking signal that is sent by the UE based on the transmission configuration information;

determining, by the network device, TA adjustment information of the UE based on an uplink tracking signal; and sending, by the network device, the TA adjustment information to the UE.

In this solution, the network device may configure a transmission mode and the transmission cycle for the uplink tracking signal of the UE, and send the transmission mode and the transmission cycle to the UE by using the transmission configuration information, so that the UE sends the uplink tracking signal according to the transmission cycle. The network device obtains the TA adjustment information of the UE based on the uplink tracking signal, and returns the TA adjustment information to the UE. After the configuration, the uplink tracking signal for tracking the UE is periodically sent to the network device, and the network device returns the TA adjustment information to the UE after the network device receives the uplink tracking signal, to reduce signaling overheads between the UE and the network device. This is more suitable for tracking the UE in the low power mode.

Optionally, the sending, by a network device, transmission configuration information to user equipment UE includes:

sending, by the network device, radio resource control information to the UE, where the radio resource control information includes the transmission configuration information; or sending, by the network device, a system broadcast message, where the system broadcast message includes the transmission configuration information.

Optionally, the receiving, by the network device, the uplink tracking signal that is sent by the UE based on the transmission configuration information includes:

determining, by the network device based on the transmission cycle, a location of a first radio frame and a location of a first scheduling unit in the first radio frame that are for sending the uplink tracking signal by the UE; and receiving, at the location of the first scheduling unit in the first radio frame by the network device, the uplink tracking signal sent by the UE.

Optionally, the transmission configuration information is further used to indicate that a reception mode of the UE is a discontinuous reception mode, and the transmission configuration information further includes a reception cycle of receiving the TA adjustment information by the UE.

In this solution, a configuration process of the network device is intended for the UE, but a network device side also needs to correspondingly have the configuration to cooperate with operations of a UE side.

Optionally, the sending, by the network device, the TA adjustment information to the UE includes:

determining, by the network device based on the reception cycle, a location of a second radio frame and a location of a second scheduling unit in the second radio frame that are for receiving the TA adjustment information by the UE; and sending, at the location of the second scheduling unit in the second radio frame by the network device, the TA adjustment information to the UE.

Optionally, before the sending, by a network device, transmission configuration information to user equipment UE, the method further includes:

determining, by the network device through detection, whether a moving speed of the UE is less than a preset speed threshold, where if the moving speed of the UE is less than the preset speed threshold, the reception cycle is greater than or equal to the transmission cycle.

In this solution, to determine a specific manner of configuring the transmission cycle and the reception cycle, the network device needs to determine the moving speed of the UE to determine whether the UE is static or almost static; and if the UE is static or almost static, the network device may configure the reception cycle to be greater than the transmission cycle.

Based on the foregoing solution, before the determining, by the network device through detection, whether a moving speed of the UE is less than a preset speed threshold, the method further includes:

determining, by the network device, the moving speed of the UE based on a service attribute or a feature of the UE that is reported by the UE; or obtaining, by the network device, the moving speed of the UE through Doppler measurement; or obtaining, by the network device, the moving speed of the UE based on energy measurement information that is of a downlink reference signal and that is reported by the UE.

In this solution, the network device may determine, based on the feature or the service attribute that is initially reported by the UE, whether the UE is a mobile terminal or a static terminal, to indirectly determine the moving speed of the UE; or may obtain the moving speed of the UE through Doppler measurement. The network device may alternatively determine the moving speed of the UE based on an energy measurement status of the downlink reference signal of the UE. This is not specifically limited.

Optionally, the sending, by the network device, the TA adjustment information to the UE includes:

sending, at the location of the second scheduling unit in the second radio frame by the network device, the TA adjustment information to the UE through a downlink physical control channel; and/or sending, at the location of the second scheduling unit in the second radio frame by the network device, the TA adjustment information to the UE through a downlink shared channel.

A third aspect of this application provides user equipment, including:

a receiving module, configured to obtain transmission configuration information between the user equipment and a network device, where the transmission configuration information indicates that an uplink tracking signal is to be sent according to a discontinuous transmission mode, and the transmission configuration information includes a transmission cycle; and a sending module, configured to: when the user equipment enters a low power mode, send an uplink tracking signal to the network device based on the transmission configuration information, where the receiving module is further configured to receive TA adjustment information returned by the network device, where the TA adjustment information is obtained by the network device through detection of the uplink tracking signal.

Optionally, the receiving module is specifically configured to receive the transmission configuration information sent by the network device.

Optionally, the user equipment further includes:

a processing module, configured to determine, based on the transmission cycle, a location of a first radio frame and a location of a first scheduling unit in the first radio frame that are for sending the uplink tracking signal, where the sending module is specifically configured to send, at the location of the first scheduling unit in the first radio frame, the uplink tracking signal to the network device.

Optionally, the transmission configuration information obtained by the obtaining module is further used to indicate that a reception mode of the UE is a discontinuous reception mode, and the transmission configuration information further includes a reception cycle.

Optionally, the processing module is specifically configured to determine, based on the reception cycle, a location of a second radio frame and a location of a second scheduling unit in the second radio frame that are for receiving the TA adjustment information; and the receiving module is specifically configured to receive, at the location of the second scheduling unit in the second radio frame, the TA adjustment information sent by the network device.

Optionally, when a moving speed of the user equipment is less than a preset speed threshold, the reception cycle is greater than or equal to the transmission cycle.

Optionally, the receiving module is specifically configured to receive, at the location of the second scheduling unit in the second radio frame, the TA adjustment information sent by the network device through a downlink control channel; and/or the receiving module is further specifically configured to receive, at the location of the second scheduling unit in the second radio frame, the TA adjustment information sent by the network device through a downlink shared channel.

Optionally, the receiving module is specifically configured to:

receive radio resource control information sent by the network device, where the radio resource control information includes the transmission configuration information; or receive a system broadcast message of the network device, where the system broadcast message includes the transmission configuration information.

Optionally, the processing module is further configured to adjust an uplink sending moment based on the TA adjustment information.

A fourth aspect of this application provides a network device, including:

a sending module, configured to send transmission configuration information to UE, where the transmission configuration information indicates that the UE sends an uplink tracking signal according to a discontinuous transmission mode, and the transmission configuration information includes a transmission cycle for sending the uplink tracking signal by the UE;

a receiving module, configured to receive the uplink tracking signal that is sent by the UE based on the transmission configuration information; and a processing module, configured to determine TA adjustment information of the UE based on the uplink tracking signal, where the sending module is further configured to send the TA adjustment information to the UE.

Optionally, the processing module is specifically configured to determine, based on the transmission cycle, a location of a first radio frame and a location of a first scheduling unit in the first radio frame that are for sending the uplink tracking signal by the UE; and the receiving module is specifically configured to receive, at the location of the first scheduling unit in the first radio frame, the uplink tracking signal sent by the UE.

Optionally, the transmission configuration information is further used to indicate that a reception mode of the UE is a discontinuous reception mode, and the transmission configuration information further includes a reception cycle of receiving the TA adjustment information by the UE.

Optionally, the processing module is further specifically configured to determine, based on the reception cycle, a location of a second radio frame and a location of a second scheduling unit in the second radio frame that are for receiving the TA adjustment information by the UE; and the sending module is further configured to send, at the location of the second scheduling unit in the second radio frame, the TA adjustment information to the UE.

Optionally, the processing module is further configured to determine, through detection, whether a moving speed of the UE is less than a preset speed threshold, where if the moving speed of the UE is less than the preset speed threshold, the reception cycle is greater than or equal to the transmission cycle.

Optionally, the sending module is specifically configured to:

send, at the location of the second scheduling unit in the second radio frame, the TA adjustment information to the UE through a downlink physical control channel; and/or send, at the location of the second scheduling unit in the second radio frame, the TA adjustment information through a downlink shared channel.

Optionally, the processing module is further configured to:

determine the moving speed of the UE based on a service attribute or a feature of the UE that is reported by the UE; or obtain the moving speed of the UE through Doppler measurement; or obtain the moving speed of the UE based on energy measurement information that is of a downlink reference signal and that is reported by the UE.

A fifth aspect of this application provides user equipment, including:

a receiver, configured to obtain transmission configuration information between the user equipment and a network device, where the transmission configuration information indicates that an uplink tracking signal is to be sent according to a discontinuous transmission mode, and the transmission configuration information includes a transmission cycle; and a transmitter, configured to: when the user equipment enters a low power mode, send an uplink tracking signal to the network device based on the transmission configuration information, where the receiver is further configured to receive TA adjustment information returned by the network device, where the TA adjustment information is obtained by the network device through detection of the uplink tracking signal.

Optionally, the receiver is specifically configured to receive the transmission configuration information sent by the network device.

Optionally, the user equipment further includes: a processor, configured to determine, based on the transmission cycle, a location of a first radio frame and a location of a first scheduling unit in the first radio frame that are for sending the uplink tracking signal; and the transmitter is specifically configured to send, at the location of the first scheduling unit in the first radio frame, the uplink tracking signal to the network device.

Optionally, the processor is further configured to adjust an uplink sending moment based on the TA adjustment information.

Optionally, the transmission configuration information is further used to indicate that a reception mode of the user equipment is a discontinuous reception mode, and the transmission configuration information further includes a reception cycle.

Optionally, the processor is specifically configured to determine, based on the reception cycle, a location of a second radio frame and a location of a second scheduling unit in the second radio frame that are for receiving the TA adjustment information; and the receiver is specifically configured to receive, at the location of the second scheduling unit in the second radio frame, the TA adjustment information sent by the network device.

Optionally, when a moving speed of the user equipment is less than a preset speed threshold, the reception cycle is greater than or equal to the transmission cycle.

The user equipment may further include a memory, configured to store a processor executable instruction. The receiver and the transmitter respectively implement a receiving function and a sending function.

A sixth aspect of this application provides a network device, including:

a transmitter, configured to send transmission configuration information to user equipment UE, where the transmission configuration information indicates that the UE sends an uplink tracking signal according to a discontinuous transmission mode, and the transmission configuration information includes a transmission cycle for sending the uplink tracking signal by the UE;

a receiver, configured to receive the uplink tracking signal that is sent by the UE based on the transmission configuration information; and a processor, configured to determine timing advance TA adjustment information of the UE based on the uplink tracking signal, where the transmitter is further configured to send the TA adjustment information to the UE.

Optionally, the processor is specifically configured to determine, based on the transmission cycle, a location of a first radio frame and a location of a first scheduling unit in the first radio frame that are for sending the uplink tracking signal by the UE; and the receiver is specifically configured to receive, at the location of the first scheduling unit in the first radio frame, the uplink tracking signal sent by the UE.

Optionally, the transmission configuration information is further used to indicate that a reception mode of the UE is a discontinuous reception mode, and the transmission configuration information further includes a reception cycle of receiving the TA adjustment information by the UE.

Optionally, the processor is further specifically configured to determine, based on the reception cycle, a location of a second radio frame and a location of a second scheduling unit in the second radio frame that are for receiving the TA adjustment information by the UE; and the transmitter is further configured to send, at the location of the second scheduling unit in the second radio frame, the TA adjustment information to the UE.

Optionally, the processor is further configured to determine, through detection, whether a moving speed of the UE is less than a preset speed threshold, where if the moving speed of the UE is less than the preset speed threshold, the reception cycle is greater than or equal to the transmission cycle.

In a specific implementation of the network device or the user equipment, a computer program and a memory may be further included. The computer program is stored in the memory. The processor runs the computer program to perform the processing method for tracking UE in a low power mode. There is at least one processor. The processor is configured to execute an execution instruction stored in the memory, namely, the computer program. Therefore, data exchange is performed between the user equipment and the network device through a communications interface, to perform the processing method for tracking UE in a low power mode that is provided in various implementations of the foregoing aspects. Optionally, the memory may be further integrated in the processor.

A seventh aspect of this application provides a storage medium, including a readable storage medium and a computer program. The computer program is used to implement the processing method for tracking UE in a low power mode according to any implementation of the first aspect.

An eighth aspect of this application provides a storage medium, including a readable storage medium and a computer program. The computer program is used to implement the processing method for tracking UE in a low power mode according to any implementation of the second aspect.

A ninth aspect of this application provides a program product. The program product includes a computer program (namely, an execution instruction). The computer program is stored in a readable storage medium. At least one processor of user equipment may read the computer program from the readable storage medium. The at least one processor executes the computer program to enable the user equipment to implement the processing method for tracking UE in a low power mode that is provided in various implementations of the first aspect.

A tenth aspect of this application provides a program product. The program product includes a computer program (namely, an execution instruction). The computer program is stored in a readable storage medium. At least one processor of a network device may read the computer program from the readable storage medium. The at least one processor executes the computer program to enable the network device to implement the processing method for tracking UE in a low power mode that is provided in various implementations of the second aspect.

According to the processing method for tracking UE in a low power mode, and the device that are provided in this application, the uplink tracking signal specially used for UE tracking processing is put forward, and the cycle and the transmission mode for sending the uplink tracking signal by the UE are configured. After entering the low power mode, the UE uses the discontinuous transmission mode, and sends the uplink tracking signal to the network device according to the transmission cycle in the transmission configuration information. The network device obtains the TA adjustment information of the UE based on the uplink tracking signal, and returns the TA adjustment information to the UE, so that the UE adjusts the uplink sending moment. After the configuration, the uplink tracking signal for tracking the UE is periodically sent to the network device, and the network device returns the TA adjustment information to the UE after the network device receives the uplink tracking signal, to reduce signaling overheads between the UE and the network device. This is more suitable for tracking the UE in the low power mode.

DETAILED DESCRIPTION

Figure 1:
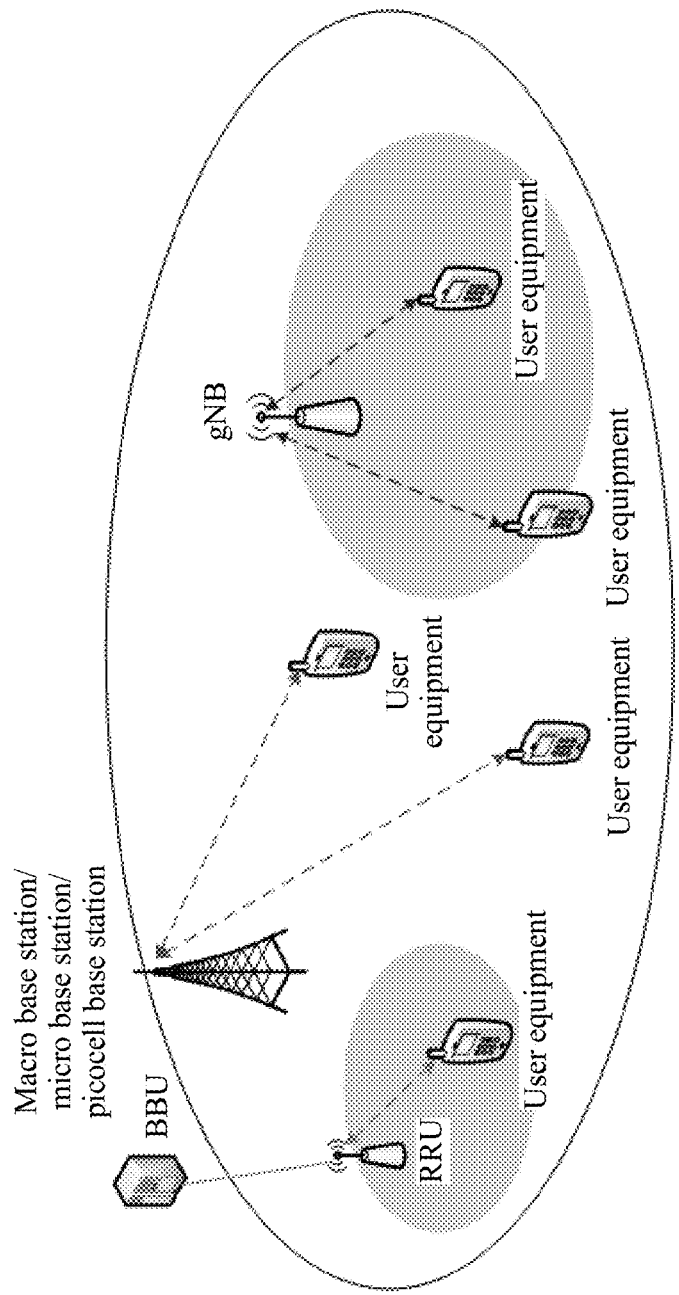
FIG. 1 is a schematic architectural diagram of a wireless communications system according to technical solutions of this application.

FIG. 1 is a schematic architectural diagram of a wireless communications system according to technical solutions of this application. As shown in FIG. 1, a processing method for tracking UE in a low power mode that is provided in this application is mainly applied in a process of updating uplink TA for a terminal in an ECO mode in the system, to implement uplink time synchronization and ensure reliable uplink transmission. In consideration of air interface transmission, in the architectural diagram of the system, network elements related to this application are mainly a network device and user equipment. The user equipment is also referred to as a terminal device (for example, a user-side mobile phone and a tablet computer). The network device may be a network-side device, for example, a base station; or another network-side device that has a similar function as a base station; or a terminal. For example, a terminal that serves as a transmitter in device-to-device (D2D) communication plays the role of the network device.

If the network device is a base station, the base station may be a macro base station/a micro base station/a picocell base station (macro/micro/pico) in a conventional Universal Mobile Telecommunications System (UMTS) or an LTE wireless communications system; or may be a baseband processing unit (BBU) and a radio frequency unit (RRU) in a distributed base station system; or may be a next generation NodeB (gNB) in a 5G network.

In specific implementation, the network device and the user equipment each include:
a transmitter and a receiver for implementing wireless reception and transmission functions; and
a processor, also referred to as a data processor, including:
a modulation encoder and the like configured to process to-be-sent data, and a demodulation decoder and the like configured to process received data.

Figure 2:
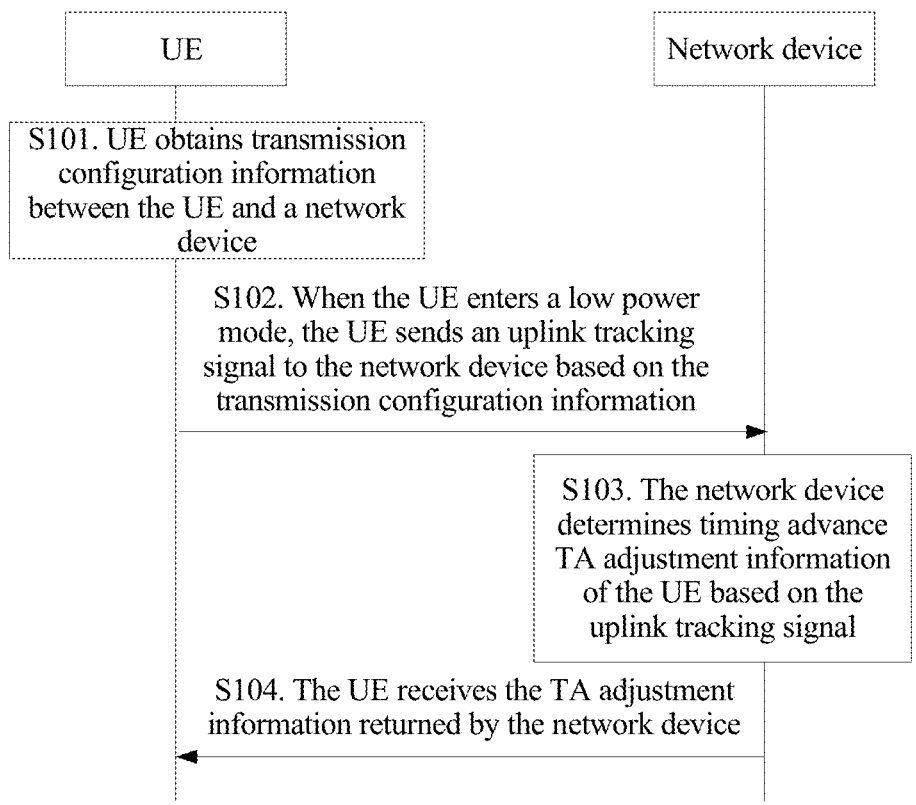
FIG. 2 is a flowchart of Embodiment 1 of a processing method for tracking UE in a low power mode according to this application.

FIG. 2 is a flowchart of Embodiment 1 of a processing method for tracking UE in a low power mode according to this application. As shown in FIG. 2, in the system architecture shown in FIG. 1, specific implementation steps of the processing method for tracking UE in a low power mode are as follows:

S101. UE obtains transmission configuration information between the UE and a network device.

In this step, the UE, also referred to as a terminal, needs to obtain, in a UE connected mode, the transmission configuration information for sending an uplink tracking signal. The transmission configuration information instructs to configure a transmission mode of the uplink tracking signal as a discontinuous transmission mode. In other words, the uplink tracking signal is to be sent in the discontinuous transmission mode based on a transmission cycle. In addition, the transmission configuration information includes the transmission cycle.

In this solution, the transmission cycle in the transmission configuration information obtained by the UE may be a fixed cycle, or may be a variable cycle that may change according to a configured rule. To be specific, in a subsequent processing process of tracking the UE, the UE may re-obtain the transmission configuration information to adjust the transmission cycle, or may change the transmission cycle according to a preconfigured cycle changing rule.

Optionally, a specific manner of obtaining the transmission configuration information by the UE is receiving the transmission configuration information sent by the network device. In other words, the network device sends the transmission configuration information to the UE. In a specific implementation, the receiving, by the UE, the transmission configuration information sent by the network device includes at least the following two implementations.

In a first implementation, the UE receives radio resource control information sent by the network device, where the radio resource control information includes the transmission configuration information.

This means that the network device sends the radio resource control information to the UE, and the radio resource control information carries the transmission configuration information. In other words, the network device sends the transmission configuration information to the UE in an initial access process of the UE.

In a second implementation, the UE receives a system broadcast message of the network device, where the system broadcast message includes the transmission configuration information.

This means that the network device sends the transmission configuration information by using the system broadcast message. The system broadcast message may include transmission configuration information of a plurality of UEs.

S102. When the UE enters a low power mode, the UE sends an uplink tracking signal to the network device based on the transmission configuration information.

After the foregoing configuration is completed, when the UE enters the low power mode, namely, an ECO mode, the UE may send the uplink tracking signal to the network device based on a transmission cycle in the transmission configuration information, and the network device receives the uplink tracking signal that is sent by the UE based on the transmission configuration information.

S103. The network device determines timing advance TA adjustment information of the UE based on the uplink tracking signal.

In this step, the network device measures the uplink tracking signal to obtain the TA adjustment information of the UE.

Optionally, the network device in this step may be the foregoing network device to which the UE sends the uplink tracking signal, or may be another network device. In other words, a process of obtaining TA adjustment information by detecting the uplink tracking signal may be performed by another device.

S104. The UE receives the TA adjustment information returned by the network device.

In this step, after detecting the TA adjustment information, the network device returns the TA adjustment information to the UE, and the UE receives the TA adjustment information returned by the network device. The TA adjustment information is used to adjust a moment at which an uplink signal is sent.

In this solution, the network device that obtains the TA adjustment information through detection of the uplink tracking signal may be the network device to which the UE sends the uplink tracking signal, or may be the another network device. The another network device obtains the TA adjustment information through detection of the uplink tracking signal, and sends the TA adjustment information to the network device. Then, the network device returns the TA adjustment information to the UE.

According to the processing method for tracking UE in a low power mode that is provided in this embodiment, the uplink tracking signal specially used for UE tracking processing is put forward, and the cycle and the transmission mode for sending the uplink tracking signal by the UE are configured. After entering the low power mode, the UE uses the discontinuous transmission mode, and sends the uplink tracking signal to the network device according to the transmission cycle in the transmission configuration message. The network device obtains the TA adjustment information of the UE based on the uplink tracking signal, and returns the TA adjustment information to the UE, so that the UE adjusts an uplink sending moment. After the configuration, the uplink tracking signal for tracking the UE is periodically sent to the network device, and the network device returns the TA adjustment information to the UE after the network device receives the uplink tracking signal, to reduce signaling overheads between the UE and the network device. This is more suitable for tracking the UE in the low power mode.

Figure 3:
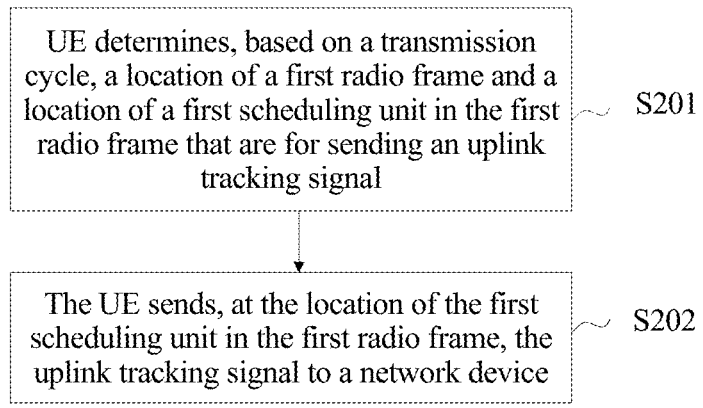
FIG. 3 is a flowchart of Embodiment 2 of a processing method for tracking UE in a low power mode according to this application.

FIG. 3 is a flowchart of Embodiment 2 of a processing method for tracking UE in a low power mode according to this application. As shown in FIG. 3, based on Embodiment 1, step S102 in which the UE sends an uplink tracking signal to the network device based on the transmission configuration information is specifically implemented by using the following steps.

S201. The UE determines, based on a transmission cycle, a location of a first radio frame and a location of a first scheduling unit in the first radio frame that are for sending the uplink tracking signal.

In this step, a specific implementation of the sending, by the UE, an uplink tracking signal based on the transmission configuration information includes: first, determining the location of the first radio frame based on the transmission cycle, where the location of the first radio frame is a time sequence location of the first radio frame or a frame number of the first radio frame, to indicate a moment at which the first radio frame is to be sent; and obtaining a specific location, in the first radio frame, at which the uplink tracking signal is to be sent, that is, the location of the first scheduling unit.

S202. The UE sends, at the location of the first scheduling unit in the first radio frame, the uplink tracking signal to the network device.

In this step, after determining the location of the first radio frame and the location of the first scheduling unit in the first radio frame, the UE sends the uplink tracking signal to the network device at the location of the first scheduling unit.

For the network device, the network device obtains, based on the transmission cycle, the location of the first radio frame and the location of the first scheduling unit in the first radio frame that are for sending the uplink tracking signal by the UE; and then receives, at the location of the first scheduling unit in the first radio frame, the uplink tracking signal sent by the UE.

Subsequently, the network device detects the uplink tracking signal to obtain TA adjustment information of the UE, and returns the TA adjustment information to the UE. Therefore, the UE adjusts an uplink sending moment based on the TA adjustment information, and may send an uplink signal after the adjustment.

Based on any foregoing embodiment, the transmission configuration information is further used to indicate that a reception mode of the UE is a discontinuous reception mode, and the transmission configuration information further includes a reception cycle. The reception mode herein means that the UE may use the discontinuous reception mode to receive the TA adjustment information. In addition, the reception cycle for receiving the TA adjustment information by the UE is also configured. Being similar to the transmission cycle, the reception cycle may be a configured fixed cycle, or may be a variable cycle that changes according to a specific rule.

Likewise, a configuration process of the network device is intended for the UE, but a network device side also needs to correspondingly have the configuration to cooperate with operations of a UE side.

In any implementation, when receiving the timing advance TA adjustment information returned by the network device, the UE also needs to obtain, based on the reception cycle, a location of a second radio frame and a location of a second scheduling unit in the second radio frame that are for receiving the TA adjustment information, and then receives, at the location of the second scheduling unit of the second radio frame, the TA adjustment information sent by the network device. This is similar to the process of sending an uplink tracking signal.

For the network device, the network device needs to determine, based on the reception cycle, the location of the second radio frame and the location of the second scheduling unit in the second radio frame that are for receiving the TA adjustment information by the UE; and then receives, at the location of the second scheduling unit in the second radio frame, the TA adjustment information to the UE.

According to the processing method for tracking UE in a low power mode that is provided in this embodiment, the uplink tracking signal specially used for UE tracking processing is put forward, and the cycle and the transmission mode for sending the uplink tracking signal by the UE and the reception cycle and the reception mode for receiving the TA adjustment information by the UE are configured. After entering the low power mode, the UE uses the discontinuous transmission mode, and sends the uplink tracking signal to the network device according to the transmission cycle in the transmission configuration message. The network device obtains the TA adjustment information of the UE based on the uplink tracking signal, and returns the TA adjustment information to the UE. The UE receives the TA adjustment information according to the reception cycle by using the discontinuous reception mode, so that the UE adjusts an uplink sending moment. After the configuration, the uplink tracking signal for tracking the UE is periodically sent to the network device. The network device returns the TA adjustment information to the UE after the network device receives the uplink tracking signal, and the UE receives the TA adjustment information according to the reception cycle, to greatly reduce signaling overheads between the UE and the network device. This is more suitable for tracking the UE in the low power mode.

Based on the foregoing embodiment, after the UE completes an initial access process, the UE obtains the TA information, and then the UE follows a network instruction or is triggered by a timer on a UE side, to enter an ECO mode. In the ECO mode, the UE obtains, based on the transmission configuration information configured by a network or an upper layer, a parameter for sending the uplink tracking signal. For example, the UE obtains, based on the transmission cycle and the like, a location of a radio frame and a location of a scheduling unit in the radio frame that are for sending the uplink tracking signal, and sends the uplink tracking signal. A network side performs operations such as selection of a serving transmission/reception point (TRP), UE positioning, mobility processing, and uplink TA measurement based on measurement of the uplink tracking signal.

The following describes in detail a specific implementation process of a processing method for tracking UE in a low power mode that is provided in this application.

Figure 4:
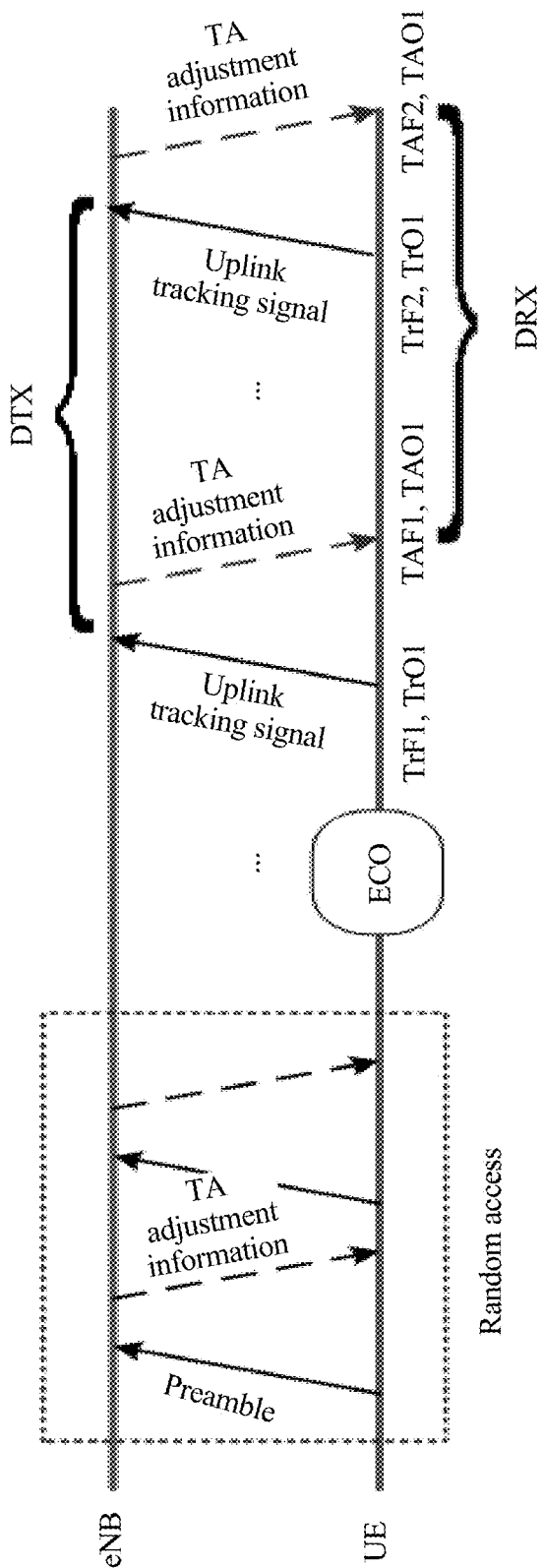
FIG. 4 is a schematic diagram of a mechanism of tracking mobile UE according to this application.

FIG. 4 is a schematic diagram of a mechanism of tracking mobile UE according to this application. As shown in FIG. 4, in a random access process of UE/when UE is in a connected mode, a network device configures a discontinuous transmission (DTX) mode for the UE, and configures a parameter such as a transmission cycle. After the UE enters an ECO mode, the UE may obtain, based on the configured parameter, a location (may be represented by using a radio frame number) of a first radio frame (TrFi) and a location of a first scheduling unit (TrOj) in the first radio frame that are for sending an uplink tracking (UL Tracking) signal. The UE sends an uplink tracking signal at the configured locations of the first radio frame and the first scheduling unit. {TrFi, TrOj} to {TrFi+1, TrOj} form an uplink transmission cycle, which is also referred to as an uplink tracking cycle. The uplink transmission cycle may be configured as 500 radio frames or 1000 radio frames. The UE enables, at a location {TrFi, TrOj}, a transmitter to send the uplink tracking signal, disables the transmitter after the sending is completed, and enters a sleep mode.

In addition, if the network device detects that TA needs to be adjusted, the network device further sends TA adjustment information to the UE. A transmission cycle of the TA adjustment information may also be configured.

The network configures the DTX mode for the uplink tracking signal of the UE. In addition, the network further needs to configure, for the UE, a feedback reception mode as a discontinuous feedback (DFB) mode for receiving a TA message, to be specific, configure a reception mode as a discontinuous reception (DRX) mode for receiving the TA adjustment information by the UE, so that the UE receives the TA adjustment information. The network configures the DFB or the DRX of the UE by configuring a parameter such as a reception cycle of the UE. The UE may obtain, based on the configured parameter, a parameter of receiving the TA adjustment information, for example, the location of the second radio frame and the location of the second scheduling unit in the second radio frame {TAFi, TAOj}. The UE wakes up only at the location {TAFi, TAOj}, and enables a receiver to detect whether there is TA adjustment information sent to the UE. As shown in FIG. 4, the UE disables the receiver after the detection is completed, and enters the sleep mode.

Figure 5:
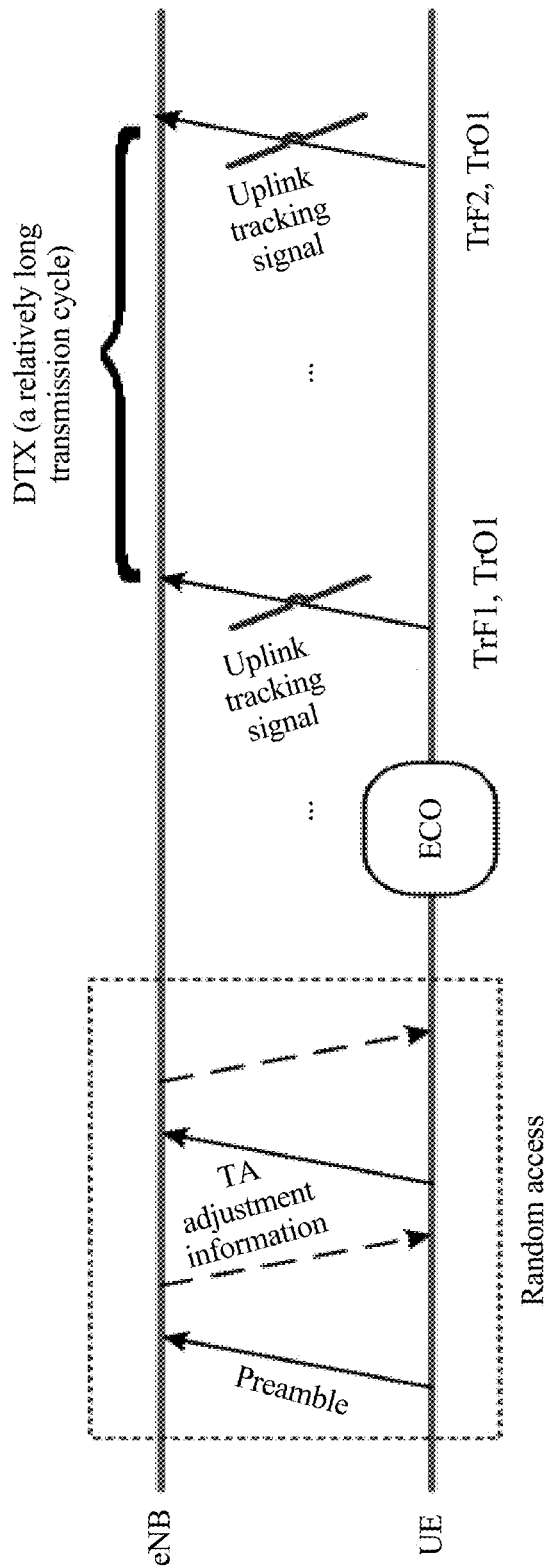
FIG. 5 is a schematic diagram of a mechanism of tracking UE having a relatively low moving speed or tracking static UE.

FIG. 5 is a schematic diagram of a mechanism of tracking UE having a relatively low moving speed or tracking static UE. As shown in FIG. 5, for static UEs or slowly moving UEs, after the UE completes an initial access process, the UE obtains TA information and enters an ECO mode. Because a location of the UE does not change in a long time, operations such as selection of a serving TRP, UE positioning, and mobility processing are basically not to be performed, and TA of the UE does not need to be adjusted either. If crystal oscillator offset accumulated in a long time may be determined by detecting an arrival time difference of a plurality of downlink signals, the UE properly adjusts a time point of sending an uplink signal in uplink transmission. This is an implementation problem. In this scenario, a cycle of sending an uplink tracking signal may be configured, by a network, very long or infinitely long, in other words, the uplink tracking signal is not to be sent.

An update requirement of the TA is not detected each time the uplink tracking signal is sent. A TA adjustment cycle may be very long especially for UE having a relatively low moving speed or for basically static UE. Therefore, the TA adjustment cycle, namely, the reception cycle, may be configured greater than or equal to the transmission cycle of sending an uplink tracking signal, to be specific, TACyc-≥TrCyc. Especially for the static UE, the reception cycle may be far greater than the transmission cycle of an uplink tracking signal.

To be specific, when a moving speed of the UE is less than a preset speed threshold, the reception cycle is greater than or equal to the transmission cycle. In this solution, that the moving speed of the UE is less than the preset speed threshold includes a case in which the moving speed of the UE is relatively small and a case in which the UE is static. When the UE is static or the moving speed of the UE is relatively small, the TA adjustment cycle may be very long. Therefore, the reception cycle may be configured greater than the transmission cycle.

A network device (the eNB in FIG. 4 and FIG. 5) calculates a TA amount based on the uplink signal, and sends TA adjustment information at a location {TAFi, TAOj} based on a requirement. The UE performs detection on a downlink channel at the location. If the TA adjustment information is detected, the UE updates an uplink sending moment based on the new TA adjustment information (the TA adjustment information includes a timing advance command). If the UE does not detect the TA adjustment information at the location, the UE determines that the uplink sending moment does not need to be adjusted. The UE determines a timing advance amount in next uplink transmission based on the latest uplink sending moment.

Figure 6:
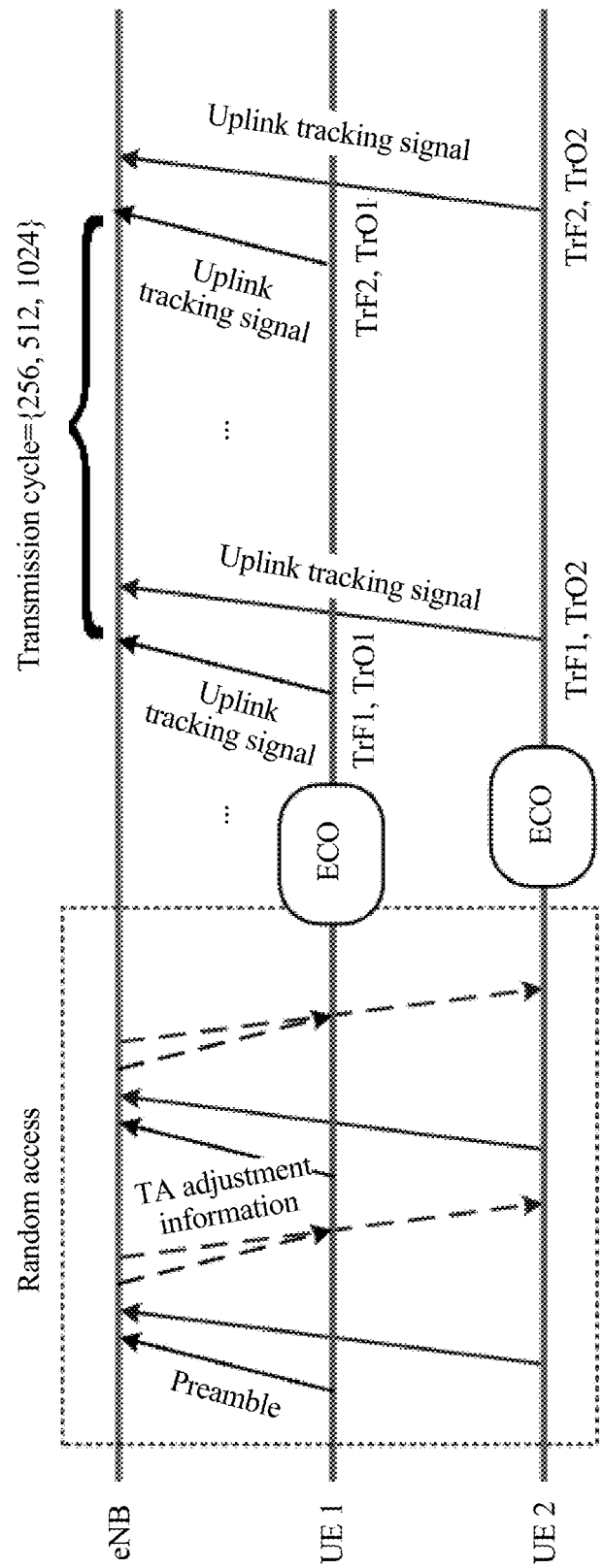
FIG. 6 is a schematic diagram of a mechanism of tracking a plurality of UEs.

FIG. 6 is a schematic diagram of a mechanism of tracking a plurality of UEs. As shown in FIG. 6, for the plurality of UEs, a network device needs to configure transmission configuration information of each UE, and sends the transmission configuration information to different UEs.

When uplink measurement is performed on the plurality of UEs in an ECO mode, parameters such as a transmission cycle and a reception cycle need to be configured differently based on moving speeds of the UEs. The network device may determine a moving speed of UE by using one or more implementations in the following:

(1) The network device determines the moving speed of the UE based on a service attribute or a feature of the UE that is reported by the UE.

This implementation means that the network may directly or indirectly determine, based on the feature of the UE or the service attribute that is reported during initial access of the UE, whether the UE is a mobile terminal or a static terminal. For example, if the attribute of the UE is a sensor, the network may directly determine that the UE is a basically static terminal. In addition, the network may detect the moving speed of the UE.

(2) The network device obtains the moving speed of the UE through Doppler measurement.

In other words, the network may determine the moving speed of the UE through Doppler measurement and the like.

(3) The network device obtains the moving speed of the UE based on energy measurement information that is of a downlink reference signal and that is reported by the UE.

The network may determine the moving speed of the UE based on energy measurement that is of a downlink reference signal and that is reported by the UE.

The network device needs to determine the moving speed of the UE; determines whether the UE is static or almost static; and if the UE is static or almost static, may configure the reception cycle greater than the transmission cycle.

The UE obtains DTX and DFB parameters based on the parameters such as the transmission cycle and the reception cycle that are configured in the transmission configuration information by the network device. Different UEs may have a same tracking parameter, for example, have a same radio frame and a same scheduling unit in the radio frame for transmission and reception, or may have a same radio frame and different scheduling units in the radio frame. As shown in FIG. 6, tracking parameters of UE 1 are {TrF1, TrO1}, and tracking parameters of UE 2 are {TrF1, TrO2}. In other words, the UE 1 and the UE 2 have the same radio frame for sending an uplink tracking signal and different scheduling units in the radio frame.

When the UE accesses different network devices in uplink and downlink, information such as control information and TA information corresponding to the UE may be exchanged between an uplink-accessed network device and a downlink-accessed network device through an X2 interface. Therefore, the uplink-accessed network device and the downlink-accessed network device are not differentiated herein. Details are not described.

In any foregoing solution, the DTX and the DFB may be configured by broadcasting a system message or by configuring radio resource control information, for example, adding a new message body.

```
DTX_Config{
    DTXCycle  ENUMERATED  {rf128, rf256, rf512,
    rf1024, rf2048, rf4096, rf8192,
    rfinfinity},
              nB  ENUMERATED  {fourT, twoT, oneT, halfT,
                  quarterT, oneEighthT,
    oneSixteenthT, oneThirtySecondT}
}
```

The UE may use a method the same as a method for obtaining a radio frame and a radio subframe for sending a paging message, to obtain a radio frame and a scheduling unit in the radio frame for sending an uplink tracking (UL tracking) signal. Use of DTXCycle and nB is the same as that of defaultPagingCycle and nB in paging configuration. Details are defined in standards, and are not described herein.

Configuration of the DFB may be obtained in combination with configuration performed by the network for DTX, for example, adding a new message body.

```
DFB_Config{
    DFBCycle    ENUMERATED {1, 2, 4, 8, 16, 32, 64,
    128, 256, 512, 1024}
    Sf          ENUMERATED   {4, 6, 8, 10}
}
```

DFBCycle is defined as a multiple relative to DTXCycle instead of a determined value. For example, if DTXCycle is configured as 128 frames, DFBCycle is configured as 1 to indicate that the UE receives a TAC feedback each time the UE sends an uplink tracking signal; or DFBCycle is configured as 2 to indicate that the UE receives a TAC feedback each time the UE sends an uplink tracking signal for two times. Herein, Sf indicates a quantity of subframes between a scheduling unit of a TAC feedback and a scheduling unit for sending the uplink tracking signal, and may be configured based on a network processing capability and a transmission capability.

After the configuration is completed in the foregoing manner, the obtained transmission configuration information is sent to each UE by using a system broadcast message or radio resource control information, so that the UE sends an uplink tracking signal based on a corresponding transmission cycle.

In any foregoing implementation, a specific implementation in which the UE receives TA adjustment information according to the reception cycle, to be specific, the UE receives, at a location of a second scheduling unit in a second radio frame, the TA adjustment information sent by the network device includes the following implementations.

In a first implementation, the TA adjustment information sent by the network device through a downlink control channel is received at the location of the second scheduling unit in the second radio frame.

This solution means that the TA adjustment information may be carried by using downlink control information. In other words, new downlink control information (DCI) is added to indicate the TA adjustment information of the UE. The UE monitors the DCI at each location {TAFi, TAOj}, and reads the TA adjustment information. The TA adjustment information may be sent based on a requirement. The TA adjustment information is carried by using the downlink control information. In other words, the network device sends, at the location of the second scheduling unit in the second radio frame, the TA adjustment information to the UE through a downlink physical control channel.

In a second implementation, the UE receives, at the location of the second scheduling unit in the second radio frame, the TA adjustment information sent by the network device through a downlink shared channel.

This manner means that the TA adjustment information may be carried by using a data packet. The network device sends, at the location of the second scheduling unit in the second radio frame, the TA adjustment information to the UE through a downlink shared channel.

In a third implementation, physical layer DCI signaling and a data packet are combined in a solution to carry the TA adjustment information. TA adjustment information carried by using the data packet may indicate TA adjustment with relatively coarse precision and a relatively large adjustment range, while a TA command carried by using the physical layer DCI signaling may indicate finer TA adjustment. The UE adjusts uplink sent TA based on a combination of TA adjustment information in the two pieces of signaling. To be specific, a specific manner in which the UE receives the TA adjustment information includes: carrying the TA adjustment information by using the downlink control information; or carrying the TA adjustment information by the downlink shared channel by using a data packet; or carrying the TA adjustment information by using a combination of physical layer downlink control signaling and a data packet message.

It should be noted that, when a group of UEs send uplink tracking signals on a same location {TrFi, TrOj}, feedbacks of the TA adjustment information may be correspondingly monitored at a same location {TAFi, TAOj}. For the three implementations, the feedback of the TA adjustment information may be based on granularity of UE, to be specific, TA adjustment information of one UE is indicated in each piece of downlink control information or/and each data packet. Alternatively, TA adjustment information of the group of UEs is multiplexed and combined in one piece of downlink control information or one data packet to be sent. In the feedback based on the granularity of UE, a UE identifier may be used to identify the TA adjustment information sent to the UE. In the feedback based on multiplexing and combination, a common identifier such as a TA-RNTI may be used to identify the TA adjustment information. In this case, all the UEs use the same TA-RNTI, and different UEs may identify TA adjustment sent to the UE by using UE identifiers in the message. The group of UEs share one piece of downlink control information and/or one packet. Therefore, resource overheads are relatively low.

In this application, the processing method for tracking UE in an ECO mode is put forward, providing at least two power-saving manners of tracking user equipment. The UE sends the uplink tracking signal based on the discontinuous transmission mode. The network device feeds back the TA adjustment information based on a requirement. The discontinuous transmission mode and the discontinuous reception mode are introduced, to not only reduce signaling overheads between the UE and the network device, but also save power for the UE. In other words, the UE can be uplink synchronized with a system while meeting an energy-saving target.

Figure 7:
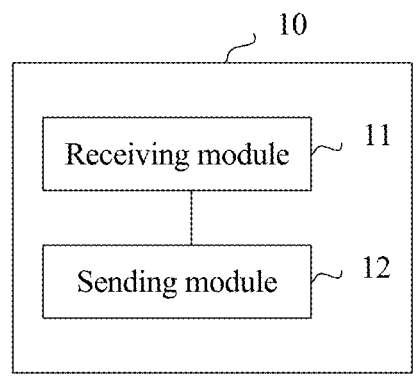
FIG. 7 is a schematic structural diagram of Embodiment 1 of user equipment according to this application.

FIG. 7 is a schematic structural diagram of Embodiment 1 of user equipment according to this application. As shown in FIG. 7, the user equipment 10 includes:

a receiving module 11, configured to obtain transmission configuration information between the user equipment 10 and a network device, where the transmission configuration information indicates that an uplink tracking signal is to be sent according to a discontinuous transmission mode, and the transmission configuration information includes a transmission cycle; and a sending module 12, configured to: when the user equipment enters a low power mode, send an uplink tracking signal to the network device based on the transmission configuration information.

The receiving module 11 is further configured to receive TA adjustment information returned by the network device, where the TA adjustment information is obtained by the network device through detection of the uplink tracking signal.

Optionally, the receiving module 11 is specifically configured to receive the transmission configuration information sent by the network device.

The user equipment provided in this embodiment is configured to perform the technical solutions on the UE side in any foregoing method embodiment. An implementation principle and a technical effect of the user equipment are similar to those in the method embodiments. Details are not described herein again.

Figure 8:
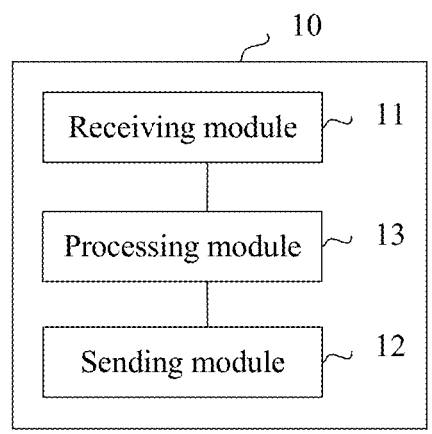
FIG. 8 is a schematic structural diagram of Embodiment 2 of user equipment according to this application.

FIG. 8 is a schematic structural diagram of Embodiment 2 of user equipment according to this application. As shown in FIG. 8, the user equipment 10 further includes:

a processing module 13, configured to determine, based on the transmission cycle, a location of a first radio frame and a location of a first scheduling unit in the first radio frame that are for sending the uplink tracking signal.

The sending module 12 is specifically configured to send, at the location of the first scheduling unit in the first radio frame, the uplink tracking signal to the network device.

Based on any foregoing embodiment of the user equipment, the transmission configuration information is further used to indicate that a reception mode of the user equipment is a discontinuous reception mode, and the transmission configuration information further includes a reception cycle.

Optionally, the processing module 13 is further configured to adjust an uplink sending moment based on the TA adjustment information.

Optionally, the processing module 13 is specifically configured to determine, based on the reception cycle, a location of a second radio frame and a location of a second scheduling unit in the second radio frame that are for receiving the TA adjustment information.

The receiving module 11 is further configured to receive, at the location of the second scheduling unit in the second radio frame, the TA adjustment information sent by the network device.

Optionally, when a moving speed of the user equipment is less than a preset speed threshold, the reception cycle is greater than or equal to the transmission cycle.

Optionally, the receiving module 11 is specifically configured to: receive, at the location of the second scheduling unit in the second radio frame, downlink control information that includes an identifier of the user equipment and that is sent by the network device, and read the TA adjustment information carried in the downlink control information; and/or the receiving module 11 is further specifically configured to receive, at the location of the second scheduling unit in the second radio frame, downlink control information sent by the network device through a shared channel.

The processing module 13 is further configured to decode the downlink control information, to obtain the TA adjustment information corresponding to the identifier of the user equipment in the downlink control information.

Optionally, the receiving module 11 is specifically configured to receive, at the location of the second scheduling unit in the second radio frame, the TA adjustment information sent by the network device through a downlink control channel; and/or the receiving module 11 is specifically configured to receive, at the location of the second scheduling unit in the second radio frame, the TA adjustment information sent by the network device through a downlink shared channel.

Optionally, the receiving module 11 is specifically configured to:

receive radio resource control information sent by the network device, where the radio resource control information includes the transmission configuration information; or receive a system broadcast message of the network device, where the system broadcast message includes the transmission configuration information.

The user equipment provided in this embodiment is configured to perform the technical solutions on the UE side in any foregoing method embodiment. An implementation principle and a technical effect of the user equipment are similar to those in the method embodiments. Details are not described herein again.

Figure 9:
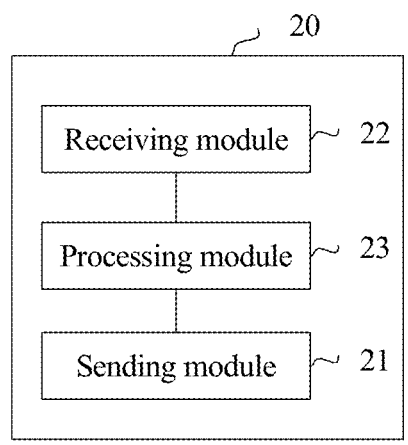
FIG. 9 is a schematic structural diagram of Embodiment 1 of a network device according to this application.

FIG. 9 is a schematic structural diagram of Embodiment 1 of a network device according to this application. As shown in FIG. 9, the network device 20 includes:

a sending module 21, configured to send transmission configuration information to UE, where the transmission configuration information indicates that the UE sends an uplink tracking signal according to a discontinuous transmission mode, and the transmission configuration information includes a transmission cycle for sending the uplink tracking signal by the UE;

a receiving module 22, configured to receive the uplink tracking signal that is sent by the UE based on the transmission configuration information; and a processing module 23, configured to determine TA adjustment information of the UE based on the uplink tracking signal.

The sending module 21 is further configured to send the TA adjustment information to the UE.

The network device provided in this embodiment is configured to perform the technical solutions on the network device side in any foregoing method embodiment. An implementation principle and a technical effect of the network device are similar to those in the method embodiments. Details are not described herein again.

In Embodiment 2 of the network device, based on the foregoing embodiment, the processing module 23 is specifically configured to determine, based on the transmission cycle, a location of a first radio frame and a location of a first scheduling unit in the first radio frame that are for sending the uplink tracking signal by the UE.

The receiving module 22 is specifically configured to receive, at the location of the first scheduling unit in the first radio frame, the uplink tracking signal sent by the UE.

Optionally, the transmission configuration information sent by the sending module 21 is further used to indicate that a reception mode of the UE is a discontinuous reception mode, and the transmission configuration information further includes a reception cycle for receiving the TA adjustment information by the UE.

Optionally, the processing module 23 is further specifically configured to determine, based on the reception cycle, a location of a second radio frame and a location of a second scheduling unit in the second radio frame that are for receiving the TA adjustment information by the UE.

The sending module 21 is further configured to send, at the location of the second scheduling unit in the second radio frame, the TA adjustment information to the UE.

Optionally, the processing module 23 is further configured to determine, through detection, whether a moving speed of the UE is less than a preset speed threshold.

If the moving speed of the UE is less than the preset speed threshold, the reception cycle is greater than or equal to the transmission cycle.

Optionally, the sending module 21 is specifically configured to:

send, at the location of the second scheduling unit in the second radio frame, the TA adjustment information to the UE through a downlink physical control channel; and/or send, at the location of the second scheduling unit in the second radio frame, the TA adjustment information to the UE through a downlink shared channel.

Optionally, the processing module 23 is further configured to:

determine the moving speed of the UE based on a service attribute or a feature of the UE that is reported by the UE; or obtain the moving speed of the UE through Doppler measurement; or obtain the moving speed of the UE based on energy measurement information that is of a downlink reference signal and that is reported by the UE.

The network device provided in this embodiment is configured to perform the technical solutions on the network device side in any foregoing method embodiment. An implementation principle and a technical effect of the network device are similar to those in the method embodiments. Details are not described herein again.

Figure 10:
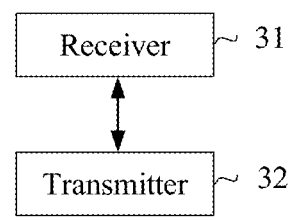
FIG. 10 is a schematic structural diagram of Embodiment 3 of user equipment according to this application.

FIG. 10 is a schematic structural diagram of Embodiment 3 of user equipment according to this application. As shown in FIG. 10, the user equipment includes a receiver 31 and a transmitter 32.

The receiver 31 is configured to obtain transmission configuration information between the user equipment and a network device, where the transmission configuration information indicates that an uplink tracking signal is to be sent according to a discontinuous transmission mode, and the transmission configuration information includes a transmission cycle.

The transmitter 32 is configured to: when the user equipment enters a low power mode, send an uplink tracking signal to the network device based on the transmission configuration information.

The receiver 31 is further configured to receive timing advance TA adjustment information returned by the network device, where the TA adjustment information is obtained by the network device through detection of the uplink tracking signal.

Optionally, the receiver 31 is specifically configured to receive the transmission configuration information sent by the network device.

The user equipment provided in this embodiment is configured to perform the technical solutions on the user equipment side in any foregoing method embodiment. An implementation principle and a technical effect of the user equipment are similar to those in the method embodiments. Details are not described herein again.

Figure 11:
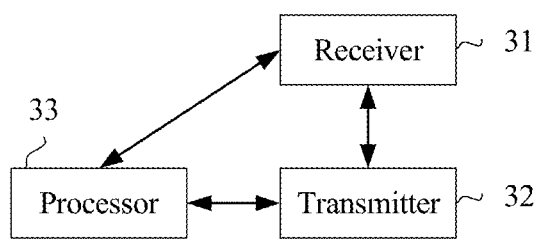
FIG. 11 is a schematic structural diagram of Embodiment 4 of user equipment according to this application.

FIG. 11 is a schematic structural diagram of Embodiment 4 of user equipment according to this application. As shown in FIG. 11, the user equipment further includes:

a processor 33, configured to determine, based on the transmission cycle, a location of a first radio frame and a location of a first scheduling unit in the first radio frame that are for sending the uplink tracking signal.

The transmitter 32 is specifically configured to send, at the location of the first scheduling unit in the first radio frame, the uplink tracking signal to the network device.

Optionally, the processor 33 is further configured to adjust an uplink sending moment based on the TA adjustment information.

Optionally, the transmission configuration information is further used to indicate that a reception mode of the user equipment is a discontinuous reception mode, and the transmission configuration information further includes a reception cycle.

Optionally, the processor 11 is specifically configured to determine, based on the reception cycle, a location of a second radio frame and a location of a second scheduling unit in the second radio frame that are for receiving the TA adjustment information.

The receiver 31 is specifically configured to receive, at the location of the second scheduling unit in the second radio frame, the TA adjustment information sent by the network device.

Optionally, when a moving speed of the user equipment is less than a preset speed threshold, the reception cycle is greater than or equal to the transmission cycle.

The user equipment provided in this embodiment is configured to perform the technical solutions on the user equipment side in any foregoing method embodiment. An implementation principle and a technical effect of the user equipment are similar to those in the method embodiments. Details are not described herein again.

Figure 12:
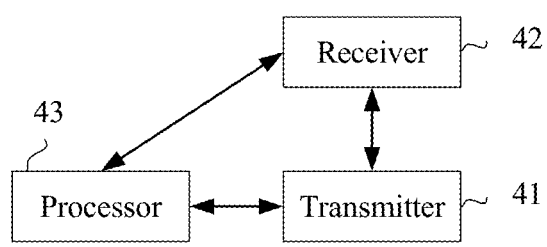
FIG. 12 is a schematic structural diagram of Embodiment 2 of a network device according to this application.

FIG. 12 is a schematic structural diagram of Embodiment 2 of a network device according to this application. As shown in FIG. 12, the network device includes a transmitter 41, a receiver 42, and a processor 43.

The transmitter 41 is configured to send transmission configuration information to user equipment UE, where the transmission configuration information indicates that the UE sends an uplink tracking signal according to a discontinuous transmission mode, and the transmission configuration information includes a transmission cycle for sending the uplink tracking signal by the UE.

The receiver 42 is configured to receive the uplink tracking signal that is sent by the UE based on the transmission configuration information.

The processor 43 is configured to determine timing advance TA adjustment information of the UE based on the uplink tracking signal.

The transmitter 41 is further configured to send the TA adjustment information to the UE.

Optionally, the processor 43 is specifically configured to determine, based on the transmission cycle, a location of a first radio frame and a location of a first scheduling unit in the first radio frame that are for sending the uplink tracking signal by the UE.

The receiver 42 is specifically configured to receive, at the location of the first scheduling unit in the first radio frame, the uplink tracking signal sent by the UE.

Optionally, the transmission configuration information is further used to indicate that a reception mode of the UE is a discontinuous reception mode, and the transmission configuration information further includes a reception cycle for receiving the TA adjustment information by the UE.

Optionally, the processor 43 is further specifically configured to determine, based on the reception cycle, a location of a second radio frame and a location of a second scheduling unit in the second radio frame that are for receiving the TA adjustment information by the UE.

The transmitter 41 is further configured to send, at the location of the second scheduling unit in the second radio frame, the TA adjustment information to the UE.

Optionally, the processor 43 is further configured to determine, through detection, whether a moving speed of the UE is less than a preset speed threshold.

If the moving speed of the UE is less than the preset speed threshold, the reception cycle is greater than or equal to the transmission cycle.

The network device provided in this embodiment is configured to perform the technical solutions on the network device side in any foregoing method embodiment. An implementation principle and a technical effect of the network device are similar to those in the method embodiments. Details are not described herein again.

In a specific implementation of the network device or the user equipment, a computer program and a memory may be further included. The computer program is stored in the memory. The processor runs the computer program to perform the processing method for tracking UE in a low power mode. There is at least one processor. The processor is configured to execute an execution instruction stored in the memory, namely, the computer program. Therefore, data exchange is performed between the user equipment and the network device through a communications interface, to perform the processing method for tracking UE in a low power mode that is provided in various implementations of the foregoing aspects. Optionally, the memory may be further integrated in the processor.

This application further provides a storage medium, including a readable storage medium and a computer program. The computer program is used to implement the processing method for tracking UE in a low power mode on a user equipment side.

This application further provides a storage medium, including a readable storage medium and a computer program. The computer program is used to implement the processing method for tracking UE in a low power mode on a network device side.

This application further provides a program product. The program product includes a computer program (namely, an execution instruction). The computer program is stored in a readable storage medium. At least one processor of user equipment may read the computer program from the readable storage medium. The at least one processor executes the computer program to enable the user equipment to implement the processing method for tracking UE in a low power mode that is provided in any foregoing implementation.

This application further provides a program product. The program product includes a computer program (namely, an execution instruction). The computer program is stored in a readable storage medium. At least one processor of a network device may read the computer program from the readable storage medium. The at least one processor executes the computer program to enable the network device to implement the processing method for tracking UE in a low power mode that is provided in any foregoing implementation.

In the foregoing embodiments of the user equipment and the network device, it should be understood that the processor may be a central processing unit (CPU); or may be another general-purpose processor, a digital signal processor (DSP), an application-specific integrated circuit (ASIC), or the like. The general purpose processor may be a microprocessor, or the processor may be any conventional processor, or the like. The steps of the methods disclosed with reference to the embodiments of this application may be directly performed and completed by using a hardware processor, or may be performed and completed by using a combination of hardware and software modules in the processor.

A person of ordinary skill in the art may understand that all or some of the steps of the method embodiments may be implemented by a program instructing related hardware. The program may be stored in a computer-readable storage. When the program runs, the steps of the method embodiments are performed. The foregoing storage (storage medium) includes: a read-only memory (ROM), a RAM, a flash memory, a hard disk, a solid-state drive, a magnetic tape, a floppy disk, an optical disc, or any combination thereof.

Finally, it should be noted that the foregoing embodiments are merely intended for describing the technical solutions of this application, but not for limiting this application.

What is claimed is:

1. A processing method for tracking a user equipment (UE) in a low power mode, the method comprising:
   obtaining, by the UE, transmission configuration information between the UE and a network device, wherein the transmission configuration information indicates that an uplink tracking signal is to be sent according to a discontinuous transmission mode, and the transmission configuration information comprises a transmission cycle;
   when the UE enters a low power mode, sending, by the UE, the uplink tracking signal to the network device based on the transmission configuration information; and
   receiving, by the UE, timing advance (TA) adjustment information sent by the network device in response to the uplink tracking signal.

2. The method according to claim 1, wherein obtaining, by the UE, the transmission configuration information between the UE and the network device comprises:

receiving, by the UE, radio resource control information sent by the network device, wherein the radio resource control information comprises the transmission configuration information; or receiving, by the UE, a system broadcast message of the network device, wherein the system broadcast message comprises the transmission configuration information.

3. The method according to claim 1, wherein sending, by the UE, the uplink tracking signal to the network device based on the transmission configuration information comprises:

determining, by the UE based on the transmission cycle, a location of a first radio frame and a location of a first scheduling unit in the first radio frame that are for sending the uplink tracking signal; and sending, by the UE at the location of the first scheduling unit in the first radio frame, the uplink tracking signal to the network device.

4. The method according to claim 1, wherein the transmission configuration information indicates that a reception mode of the UE is a discontinuous reception mode, and the transmission configuration information further comprises a reception cycle.

5. The method according to claim 4, wherein receiving, by the UE, the TA adjustment information sent by the network device comprises:

determining, by the UE based on the reception cycle, a location of a second radio frame and a location of a second scheduling unit in the second radio frame that are for receiving the TA adjustment information; and receiving, by the UE at the location of the second scheduling unit in the second radio frame, the TA adjustment information sent by the network device.

6. The method according to claim 5, wherein receiving, by the UE at the location of the second scheduling unit in the second radio frame, the TA adjustment information sent by the network device comprises:

receiving, by the UE at the location of the second scheduling unit in the second radio frame, the TA adjustment information sent by the network device through a downlink control channel; and/or receiving, by the UE at the location of the second scheduling unit in the second radio frame, the TA adjustment information sent by the network device through a downlink shared channel.

7. The method according to claim 4, wherein when a moving speed of the UE is less than a preset speed threshold, the reception cycle is greater than or equal to the transmission cycle.

8. The method according to claim 1, further comprising:
adjusting, by the UE, an uplink sending moment based on the TA adjustment information.

9. A processing method for tracking a user equipment (UE) in a low power mode, the method comprising:

sending, by a network device, transmission configuration information to the UE for sending an uplink tracking signal according to a discontinuous transmission mode, wherein the transmission configuration information comprises a transmission cycle for sending the uplink tracking signal by the UE;

receiving, by the network device, the uplink tracking signal that is sent by the UE based on the transmission configuration information;

determining, by the network device, timing advance (TA) adjustment information of the UE based on the uplink tracking signal; and sending, by the network device, the TA adjustment information to the UE.

10. The method according to claim 9, wherein receiving, by the network device, the uplink tracking signal that is sent by the UE based on the transmission configuration information comprises:

determining, by the network device based on the transmission cycle, a location of a first radio frame and a location of a first scheduling unit in the first radio frame that are for sending the uplink tracking signal by the UE; and receiving, at the location of the first scheduling unit in the first radio frame by the network device, the uplink tracking signal sent by the UE.

11. The method according to claim 9, wherein the transmission configuration information indicates that a reception mode of the UE is a discontinuous reception mode, and the transmission configuration information further comprises a reception cycle for receiving the TA adjustment information by the UE.

12. The method according to claim 11, wherein sending, by the network device, the TA adjustment information to the UE comprises:

determining, by the network device based on the reception cycle, a location of a second radio frame and a location of a second scheduling unit in the second radio frame that are for receiving the TA adjustment information by the UE; and sending, at the location of the second scheduling unit in the second radio frame by the network device, the TA adjustment information to the UE.

13. The method according to claim 11, wherein before sending, by the network device, the transmission configuration information to the UE, the method further comprises:

determining, by the network device through detection, whether a moving speed of the UE is less than a preset speed threshold, wherein when the moving speed of the UE is less than the preset speed threshold, the reception cycle is greater than or equal to the transmission cycle.

14. The method according to claim 13, wherein before determining, by the network device through the detection, whether the moving speed of the UE is less than the preset speed threshold, the method further comprises:

determining, by the network device, the moving speed of the UE based on a service attribute or a feature of the UE that is reported by the UE; or obtaining, by the network device, the moving speed of the UE through Doppler measurement; or obtaining, by the network device, the moving speed of the UE based on energy measurement information that is of a downlink reference signal and that is reported by the UE.

15. A user equipment, comprising:
a receiver, configured to obtain transmission configuration information between the user equipment and a network device, wherein the transmission configuration information indicates that an uplink tracking signal is to be sent according to a discontinuous transmission mode, and the transmission configuration information comprises a transmission cycle;

a transmitter, configured to:
when the user equipment enters a low power mode, send the uplink tracking signal to the network device based on the transmission configuration information; and wherein the receiver is further configured to receive timing advance (TA) adjustment information sent by the network device in response to the uplink tracking signal.

16. The user equipment according to claim 15, further comprising:
a processor, configured to determine, based on the transmission cycle, a location of a first radio frame and a location of a first scheduling unit in the first radio frame that are for sending the uplink tracking signal; and
wherein the transmitter is configured to send, at the location of the first scheduling unit in the first radio frame, the uplink tracking signal to the network device.

17. The user equipment according to claim 15, wherein the transmission configuration information indicates that a reception mode of the user equipment is a discontinuous reception mode, and the transmission configuration information further comprises a reception cycle.

18. A network device, comprising:
a transmitter, configured to send transmission configuration information to user equipment (UE) for sending an uplink tracking signal according to a discontinuous transmission mode, wherein the transmission configuration information comprises a transmission cycle for sending the uplink tracking signal by the UE;
a receiver, configured to receive the uplink tracking signal that is sent by the UE based on the transmission configuration information;
a processor, configured to determine timing advance (TA) adjustment information of the UE based on the uplink tracking signal; and
wherein the transmitter is further configured to send the TA adjustment information to the UE.

19. The network device according to claim 18, wherein the transmitter is configured to:
send radio resource control information to the UE, wherein the radio resource control information comprises the transmission configuration information; or
send a system broadcast message, wherein the system broadcast message comprises the transmission configuration information.

20. The network device according to claim 19, wherein:
the processor is configured to determine, based on the transmission cycle, a location of a first radio frame and a location of a first scheduling unit in the first radio frame that are for sending the uplink tracking signal by the UE; and
the receiver is configured to receive, at the location of the first scheduling unit in the first radio frame, the uplink tracking signal sent by the UE.

* * * * *